(12) United States Patent
Zhovnirovsky et al.

(10) Patent No.: US 8,109,677 B2
(45) Date of Patent: Feb. 7, 2012

(54) FIBER OPTIC CABLE CONNECTOR

(75) Inventors: Igor Zhovnirovsky, Newton, MA (US);
Subhash Roy, Lexington, MA (US);
Keith Conroy, Perkasie, PA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 13/150,496

(22) Filed: Jun. 1, 2011

(65) Prior Publication Data
US 2011/0229084 A1    Sep. 22, 2011

Related U.S. Application Data

(63) Continuation of application No. 12/483,616, filed on Jun. 12, 2009.

(51) Int. Cl.
*G02B 6/38* (2006.01)
*G02B 6/12* (2006.01)
*G02B 6/26* (2006.01)
*G02B 6/32* (2006.01)
*G02B 6/36* (2006.01)
*G02B 6/44* (2006.01)
*G02B 6/00* (2006.01)

(52) U.S. Cl. .......... 385/74; 385/14; 385/31; 385/32; 385/33; 385/34; 385/70; 385/73; 385/76; 385/88; 385/92; 385/93; 385/94; 385/100; 385/139

(58) Field of Classification Search .......... 385/14, 385/31, 32, 33, 34, 70, 73, 74, 76, 88, 92, 385/93, 94, 100, 139
See application file for complete search history.

(56) References Cited

U.S. PATENT DOCUMENTS

| | | | |
|---|---|---|---|
| 6,302,596 B1* | 10/2001 | Cohen et al. | 385/93 |
| 7,065,106 B2 | 6/2006 | Aronson | |
| 7,326,087 B2 | 2/2008 | Gerlach et al. | |
| 2005/0185900 A1* | 8/2005 | Farr | 385/93 |

OTHER PUBLICATIONS

Trewhella et al., "Evolution of optical subassemblies in IBM data communication Transceivers", IBM J. Res. & Dev., vol. 47, No. 2/3, Mar./May 2003, pp. 251-258.

* cited by examiner

*Primary Examiner* — Brian M. Healy
*Assistant Examiner* — Hung Lam
(74) *Attorney, Agent, or Firm* — Law Office of Gerald Maliszewski; Gerald Maliszewski

(57) ABSTRACT

Fiber optic cable jacks and plugs are provided. In one aspect, a cable is made from at least one length of fiber optic line having a first end and a second end. A first plug includes a one-piece mechanical body with a cable interface to engage the fiber optic line first end, and a microlens to transceive light with the cable interface. The first plug is shaped to engage a first jack housing. A second plug includes a one-piece mechanical body with a cable interface to engage the fiber optic line second end, and a microlens to transceive light with the cable interface. The second plug is shaped to engage a second jack housing. The mechanical bodies have inner walls that form an air gap cavity interposed between the microlens convex surface and an engaging jack optical interface.

16 Claims, 6 Drawing Sheets

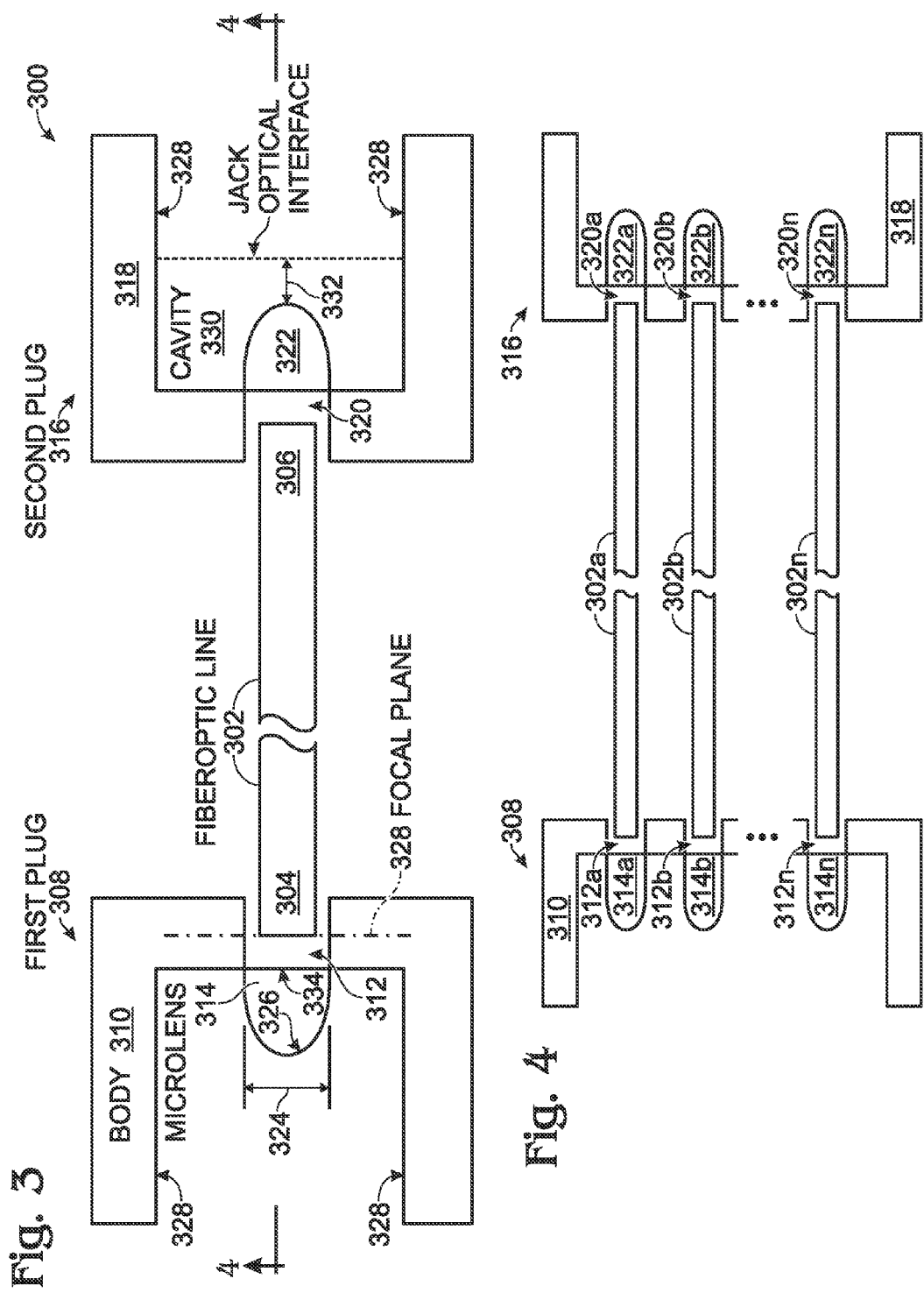

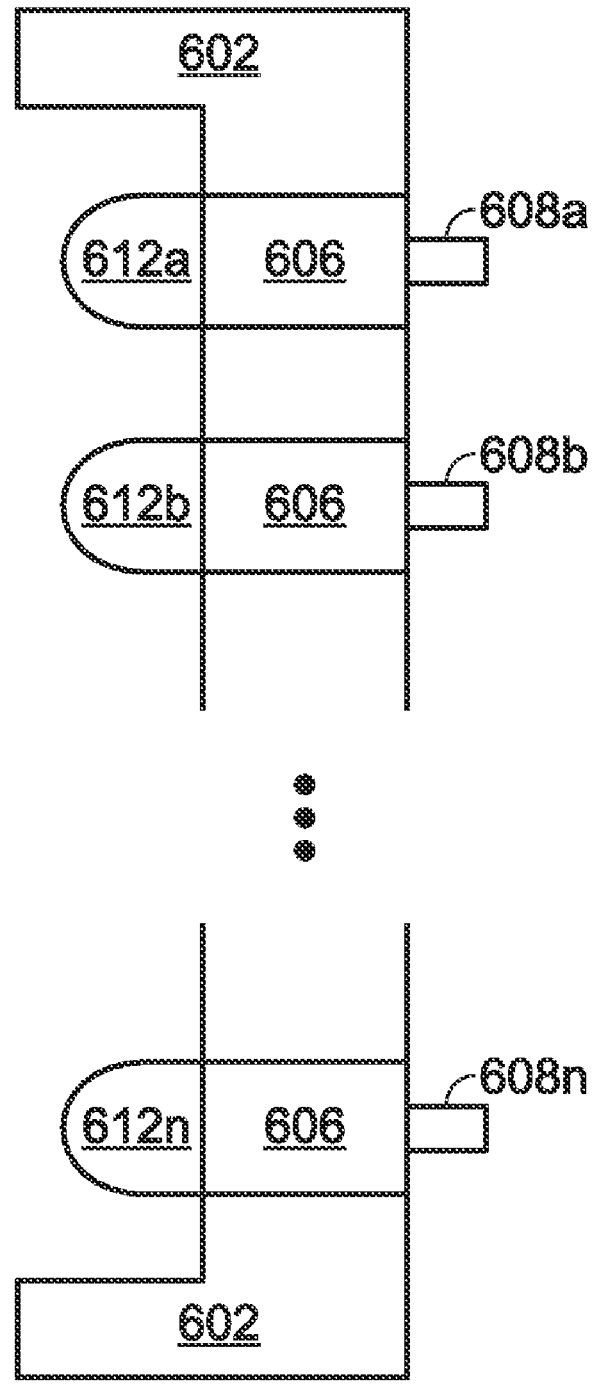

FIBER OPTIC CABLE CONNECTOR

RELATED APPLICATIONS

This application is a Continuation of a patent application entitled, FIBER OPTIC CABLE INTERFACE, invented by Igor Zhovnirovsky et al., Ser. No. 12/483,616, filed Jun. 12, 2009, which is incorporated herein by reference.

BACKGROUND OF THE INVENTION

1. Field of the Invention

This invention generally relates to optical cables and, more particularly, to a fiber optical cable with a microlens integrated into the cable housing/body.

2. Description of the Related Art

Conventionally, optical fiber connectors are spring-loaded. The fiber endfaces (optical interfaces) of the two connectors are pressed together, resulting in a direct glass to glass or plastic to plastic, contact. The avoidance of glass-to-air or plastic-to-air interfaces is critical, as an air interface results in higher connector losses. However, the tight tolerances needed to eliminate an air interface make these connectors relatively expensive to manufacture.

FIG. 1 is a partial cross-sectional view of a Transmission Optical SubAssembly (TOSA) optical cable plug (prior art). The plug 100 is made from a plastic housing 102 with a bored ferrule 106 to secure an optical fiber 108. The plug 100 also includes a plastic lens 110, manufactured as a subassembly, integrated into the plug. The lens 110 has a curved surface to create a focal plane where the plug mates with a jack 112. The lens permits a low loss air gap to be formed between the plug and a connecting jack. In addition to the expense of manufacturing a 2-part plug, the plug must be made to relatively tight tolerances, so that the lens focal plane aligns with the jack, which also increases the cost of the plug.

FIG. 2 is a partial cross-sectional view of an 8 Position 8 Contact (8P8C) interface (prior art). The ubiquitous 8P8C connector is a hardwired electrical connector used commercially and residentially to connect personal computers, printers, and routers. The 8P8C is often referred to as RJ45. Although the housing/body can be made as a one-piece plastic molding, the spring-loaded contacts and the necessity of cable crimping add to the complexity of manufacturing the part. Advantageously however, the spring-loaded contacts permit the part to be made to relatively lax tolerances.

It would be advantageous if an optical cable jack and plug could be made as a one-piece housing incorporating a microlens.

It would be advantageous if the above-mentioned optical cable jack and plug could be made to a relaxed set of tolerances.

SUMMARY OF THE INVENTION

Accordingly, a fiber optic cable is provided. The cable is made from a cable section including at least one length of fiber optic line having a first end and a second end. A first plug includes a one-piece mechanical body with a cable interface to engage the fiber optic line first end, and a microlens to transceive light with the cable interface. The first plug is shaped to engage a first jack housing. A second plug includes a one-piece mechanical body with a cable interface to engage the fiber optic line second end, and a microlens to transceive light with the cable interface. The second plug is shaped to engage a second jack housing. In one aspect, the first and second plug mechanical bodies have a form factor of an 8 Position 8 Contact (8P8C) plug mechanical body.

More explicitly, each microlens includes a convex surface for interfacing with a jack optical interface, and each cable interface is formed in a focal plane of its corresponding microlens. The mechanical bodies have inner walls that form an air gap cavity interposed between the microlens convex surface and an engaging jack optical interface. At least a portion of the mechanical bodies are transparent in the range of light wavelengths between 650 and 1800 nanometers (nm) and the microlenses are formed in the transparent portion of the mechanical bodies.

Additional details of the above-described optical cable plug, as well as an optical cable jack, a mating optical plug/jack are provided below.

BRIEF DESCRIPTION OF THE DRAWINGS

FIG. 3 is a partial cross-section view of a fiber optic cable.

FIG. 4 is a plan view of a variation of the optical cable of FIG. 3.

FIG. 7 is a plan view depicting a variation of fiber optic cable jack of FIG. 6B.

DETAILED DESCRIPTION

Figure 1:
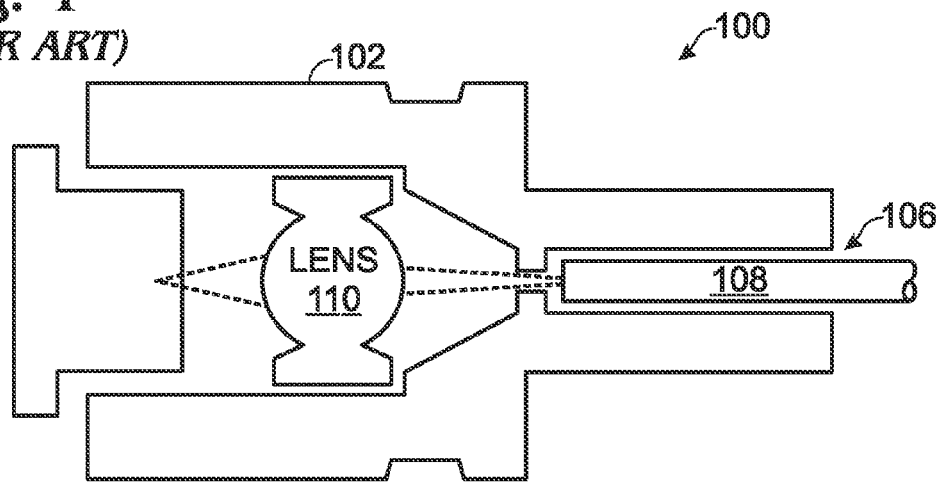
FIG. 1 is a partial cross-sectional view of a Transmission Optical SubAssembly (TOSA) optical cable plug (prior art).
Figure 2:
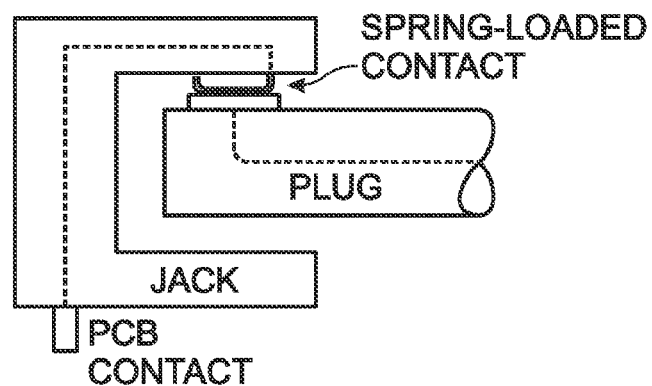
FIG. 2 is a partial cross-sectional view of an 8 Position 8 Contact (8P8C) interface (prior art).

FIG. 3 is a partial cross-section view of a fiber optic cable. The fiber optic cable 300 comprises a cable section including at least one length of fiber optic line 302 having a first end 304 and a second end 306. A first plug 308 includes a one-piece mechanical body 310 with a cable interface 312 to engage the fiber optic line first end 304, and a microlens 314 to transceive light with the cable interface 312. The first plug 308 is shaped to engage a first jack housing (not shown, see FIG. 6), A second plug 316 also includes a one-piece mechanical body 318 with a cable interface 320 to engage the fiber optic line second end 306, and a microlens 322 to transceive light with the cable interface 320. The second plug is shaped to engage a second jack housing (not shown). For example, the one-piece mechanical bodies 310/318 may be an injection molded plastic material.

Figure 8:
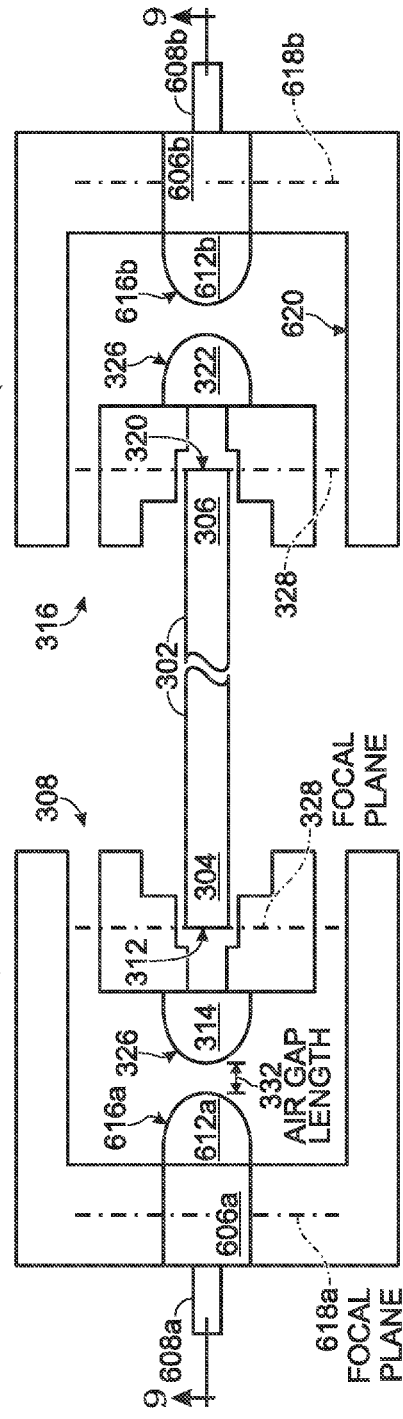
FIG. 8 is a partial cross-sectional view of a fiber optic cable interface.

In one aspect, the first and second plug mechanical bodies 310/318 have a form factor of an 8 Position 8 Contact (8P8C) plug mechanical body (see FIG. 8). This is not to say that the optical cable 300 need necessarily be mated to a conventional 8P8B electrical jack, but rather, that the mechanical bodies 310/318 can be interfaced with the next generation optical cable that will be replacing the 8P8C electrical cable. However in one aspect, the mechanical bodies can be interfaced with an 8P8C form factor jack that incorporates the electrical contacts of a convention 8P8C connector, but also includes at least one optical interface. It should be noted, however, that the fiber optic cable is not limited to any particular jack form factor.

Typically, each microlens (e.g., microlens 314) has a diameter 324 in the range of about 1-3 millimeters (mm). As shown, each microlens (e.g., microlens 314) includes a convex surface 326 for interfacing with a jack optical interface (not shown). Each cable interface (e.g., cable 110 interface 312) is formed in the focal plane 328 of its corresponding microlens. That is, the fiber ends 304 and 306 are in the focal plane 328. Note: the microlens as shown has a convex surface 326 for interfacing with a jack optical interface and a planar surface 334 adjacent the cable interface. However, the microlens is not limited to any particular shape or combination of surface shapes. A variety of lens designs are known in the art.

The mechanical bodies (e.g., body 310) form an air gap cavity 330 interposed between the microlens convex surface 326 and an engaging jack optical interface (not shown). The air gap cavity 330 has an air gap length 332 in the range of 0.1 to 1 mm.

At least a portion of the mechanical bodies 310/318 are transparent in a range of light wavelengths between 650 and 1800 nanometers (nm), and the microlenses 314/322 are formed in the transparent portion of the mechanical bodies. Note: if the connectors are used to transceive light in wavelengths outside the above-specified range, housing materials can be designed explicitly for this range, or materials can be used to more broadly transmit in the above-specified range, as well wavelengths outside this range.

FIG. 4 is a plan view of a variation, of the optical cable of FIG. 3. In this aspect the cable includes a plurality of fiber optic lines 302a through 302n, where n is a variable not limited, to any particular value. The first plug 308 has a cable interface 312a-312n and microlens 314a-314n associated with each fiber optic line. Likewise, the second plug 316 has a cable interface 320a-320n and microlens 322a-322n associated with each fiber optic line.

Figure 5:
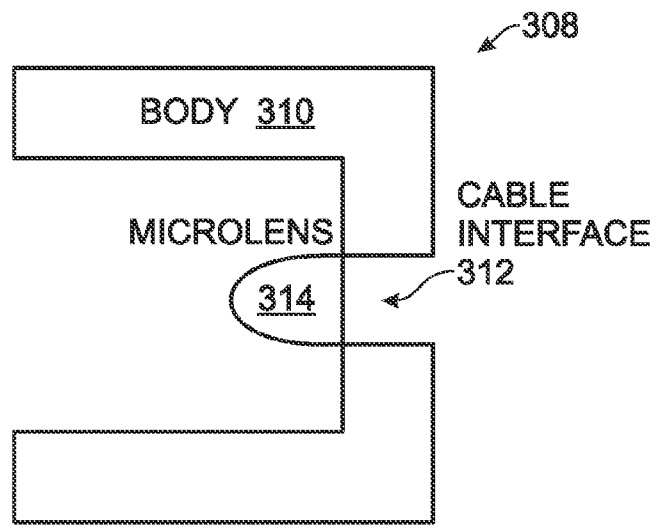
FIG. 5 is a partial cross-sectional view of a fiber optic cable plug.

FIG. 5 is a partial cross-sectional view of a fiber optic cable plug. The fiber optic cable plus is the same as the first plug 308 of FIG. 3. As such, the plug 308 comprises a one-piece mechanical body 310 for engaging a jack housing (not shown, see FIG. 6). The plug mechanical body includes a cable interface 312 to engage a fiber optic line end (not shown, see FIG. 3), and a microlens 314 to transceive light with the cable interface 312. Additional details can be found above in the explanation of FIGS. 3 and 4, and are not repeated here in the interest of brevity.

Figure 6A:
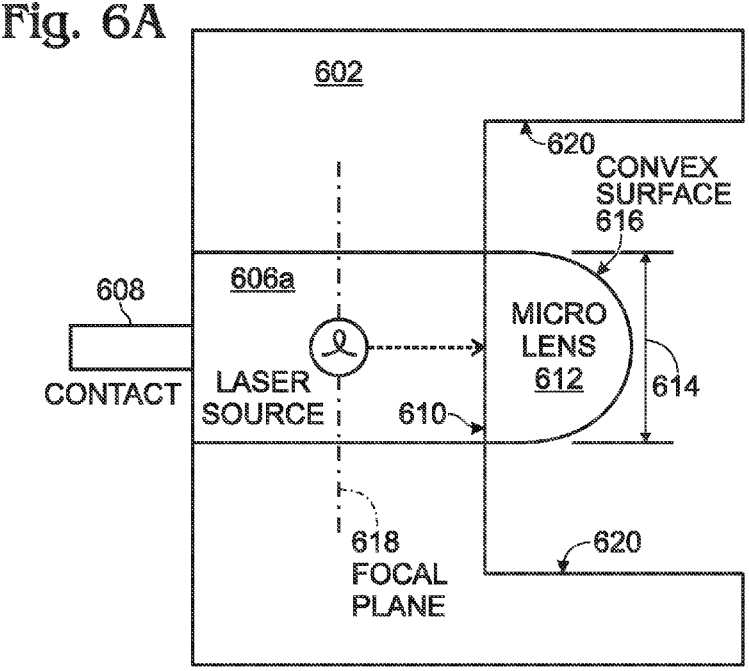
FIGS. 6A and 6B are partial cross-section views of a fiber optic cable jack.
Figure 6B:
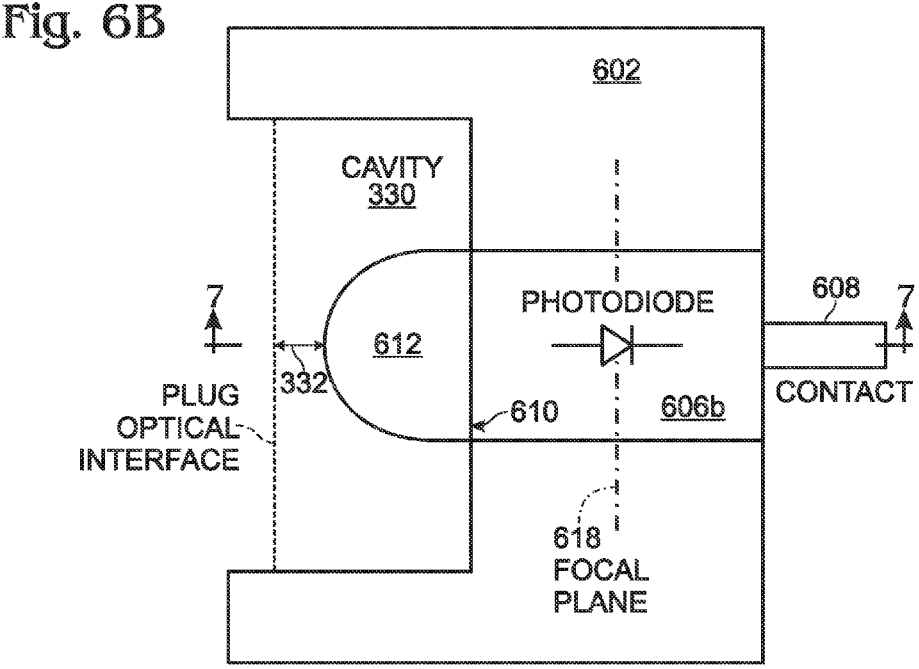

FIGS. 6A and 6B are partial cross-section views of a fiber optic cable jack. The jack 600 comprises a one-piece housing 602 for engaging a plug mechanical body (see FIGS. 3 and 5). The jack housing 602 includes a cable interface 608 to engage a printed circuit board (PCB) (not shown) and an optic element 606. In one aspect, the one-piece housing 602 is an injection molded plastic material.

As shown in FIG. 6A, the optic element is a laser source 606a (e.g., a laser diode). As shown in FIG. 6B, the optic element is a photodiode 606b. Referencing both FIGS. 6A and 6B, the optical element 606 has a first (electrical) interface connected to the contact 608 and a second (optical) interface 610. A microlens 612 is optically connected to the optic element second interface 610. As with the plug of FIGS. 3 and 5, the jack housing 602 may have the form factor of an 8P8C mechanical body (see FIG. 8).

Typically, the microlens 612 has a diameter 614 in the range of about 1-3 mm. The microlens 612 includes a convex surface 616 for interfacing with a plug optical interface (see FIG. 3) and the optic element 606 is formed in a focal plane 618 of the microlens 612. The jack housing 602 has inner walls 620 forming an air gap cavity 330 interposed between the microlens 612 and the engaging plug optical interface (not shown, see FIG. 3). The air gap cavity 330 has an air gap length 332 in a range of 0.1 to 1 mm.

As with the plug of FIG. 3, at least a portion of the housing 602 is transparent in the range of light wavelengths between 650 and 1800 nm, and the microlens 612 is formed in the transparent portion of the housing.

FIG. 7 is a plan view depicting a variation, of fiber optic cable jack of FIG. 6B. A plurality of contacts 608a through 608n, where n is a variable, engage a PCB (not shown). There is a microlens 612a-612n associated with each contact 608. Note: the optic elements 606 may be laser sources, photodiodes, or a combination, of laser sources and photodiodes.

FIG. 8 is a partial cross-sectional view of a fiber optic cable interface. In this aspect the plug and jacks have a form factor similar to an 8P8C interface. The fiber optic cable 800 comprises a cable section including a first fiber optic line 302 having a first end 304 and a second end 306. A first plug 308 includes a one-piece mechanical body 310 with a cable interface 312 to engage the fiber optic line first end 304, and a microlens 314 to transceive light between the fiber optic cable first end 304 and a first jack optical interface (i.e. microlens 612a) in the first jack housing 602a. A second plug 316 includes a one-piece mechanical 318 body with a cable interface 320 to engage the fiber optic line second end 306, and a microlens 322 to transceive light between the fiber optic cable second end 306 and a second jack optical interface (i.e. microlens 612b) in the second jack housing 602b.

A first jack 600a includes a one-piece housing 602a with a laser source 606a and a microlens optical interface 610 to transmit light from the laser source 606a to the microlens 312 of the first plug 308. The first jack housing 602a is shaped to engage the first plug mechanical body 310. A second jack 600b includes a one-piece housing 602b with a photodiode 606b and a microlens optical interface 610b to transmit light from the microlens 612b of the second plug to the photodiode 606b. The second jack housing 602b is shaped to engage the second plug mechanical body 318. Additional details of the above-described plugs and jacks can be found in the explanations of FIGS. 3-7 above, which are not repeated in the interest of brevity.

As shown, each plug microlens 314/322 includes a convex surface 326 interfaced to the corresponding jack microlens 612a/612b. As in FIG. 3, each plug cable interface 310/320 is formed in a focal plane of its corresponding microlens 314/322. The first jack microlens 612a has a convex surface 616a interfaced to the convex surface 326 of the first plug microlens 314. Likewise, the second jack microlens 612b has a convex surface 616b interfaced to the convex surface 326 of the second plug microlens 322. Each optical element (laser source 606a or photodiode 606b) is formed in a focal plane of its corresponding microlens 612.

The first and second jack housings 602a/602b have walls with in er surfaces 620. The air gap cavities 330 interposed between each plug microlens convex surface 326 and the engaging jack microlens convex surface 616, are surrounded by the jack inner surfaces 620.

Figure 9:
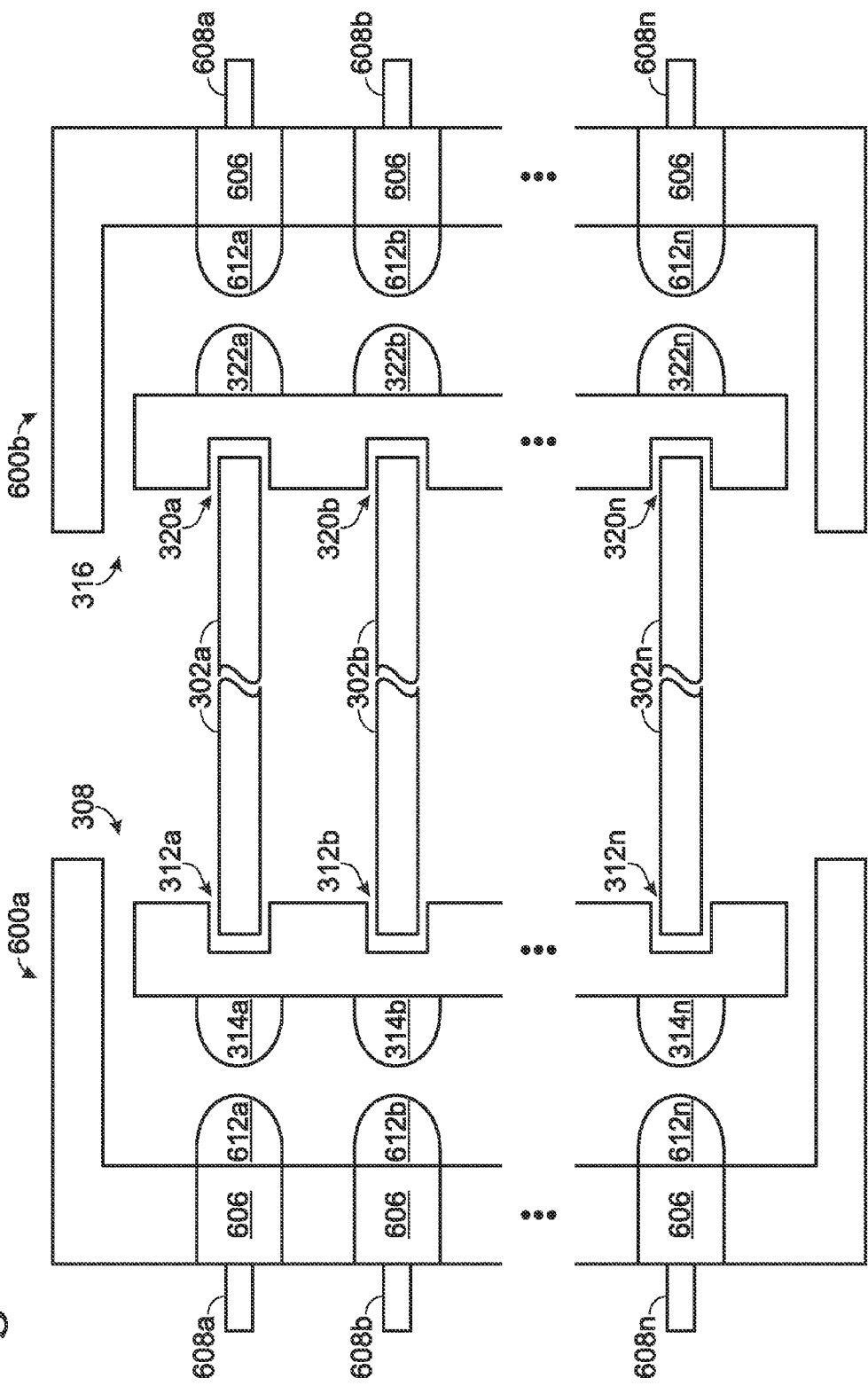
FIG. 9 is a plan view of a first variation of the fiber optic cable interface of FIG. 8.

FIG. 9 is a plan view of a first variation, of the fiber optic cable interface of FIG. 8. Shown is a plurality of fiber optic lines 302a-302n. The first and second plugs 308/318 have a microlens 314a/322a through 314n/322n and cable interface 312a/320a through 312n/320n associated with each fiber optic line 302. Likewise, the first and second jacks 600a/600b have a microlens 616 associated with each fiber optic line. Note: the first jack may include an additional laser source associated with each fiber optic line. Alternately as shown, the first jack may be comprised of a combination of laser sources and photodiode optic elements. Likewise, the second jack may include an additional photodiodes associated with each fiber optic line. Alternately as shown, the second jack may be comprised of a combination, of laser sources and photodiode optic elements.

Figure 10:
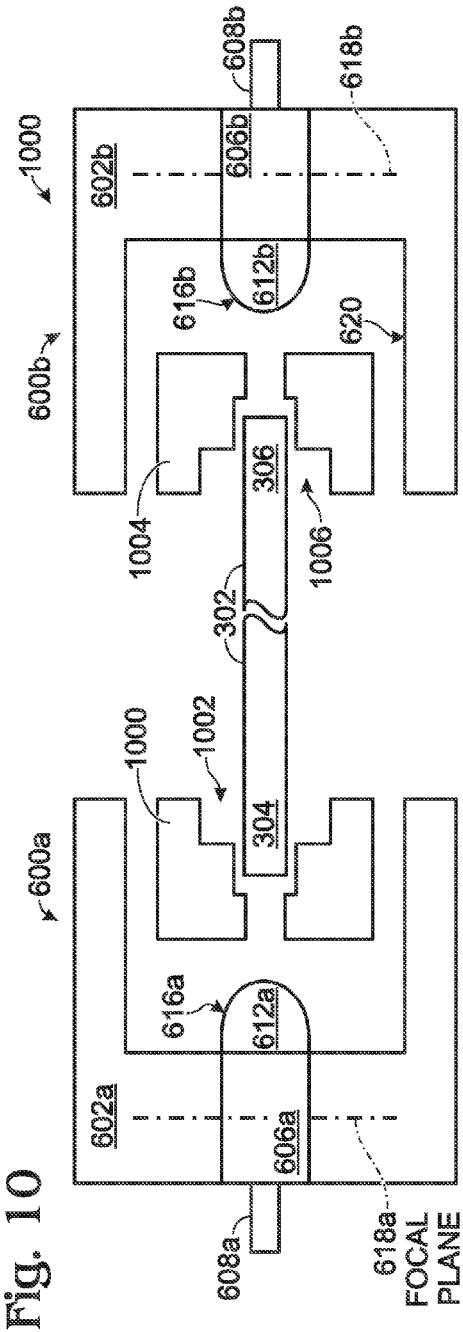
FIG. 10 is a plan view of a second variation of the fiber optic cable interface of FIG. 8.

FIG. 10 is a plan view of a second variation, of the fiber optic cable interface of FIG. 8. In this aspect, the first and second jacks 600*a* and 600*b* are as described above in the explanation of FIG. 8. The difference is that the plugs do not include a microlens. Explicitly, a cable section includes a first fiber optic line 302 having a first end 304 and, a second end 306. A first plug 1000 has a cable interface 1002 to engage the fiber optic line first end 304 and to transceive light between the fiber optic cable first end and a first jack optical interface (e.g., the convex surface 616*a* of the microlens 612*a*) in the first jack housing 602*a*. Likewise, a second plug 1004 has a cable interface 1006 to engage the fiber optic line second end 306 and to transceive light between the fiber optic cable second end 306 and a second jack optical interface (e.g., the convex surface 616*b* of the microlens 612*b*) in the second jack housing 602*b*.

Generally, the microlenses, the jack bodies, and plug housings result in a low cost alternative to conventional optical connectors. The low cost feature comes from the fact that the lens is not built separately from glass, but molded out of the body material in the same step as used to build the body. As noted above, the microlens and body/housing can be fabricated in the same process using injection molding.

Fiber optic cable jacks and plugs have been provided, built from one-piece bodies and housings that incorporate a microlens. Some examples of particular housing designs and dimensions have been given to illustrate the invention. However, the invention is not limited to merely these examples. Fiber optic cables have been shown ending with plugs, but alternately the fiber optical cable interfaces can be made using jacks instead of plugs, or a combination of a plug on one end and jack on the other end. Other variations and embodiments of the invention will occur to those skilled in the art.

We claim:

1. A fiber optic cable comprising:
a cable section including at least one length of fiber optic line having a first end and a second end;
a first plug connector including:
    a mechanical body;
    a cable interface formed in the mechanical body to fixedly engage the fiber optic line first end;
    a connector mechanical interface formed in the mechanical body capable of selectively engaging a first jack connector mechanical interface without permanently fixing the first plug connector mechanical interface to the first jack connector mechanical interface;
    a first plug microlens integrally formed in a transparent portion of the mechanical body;
    a connector optical interface forming a first air gap cavity with a length between the first plug microlens and a first jack connector optical interface, the length having a variable range of lengths subsequent to engaging the first jack connector mechanical interface with the first plug connector mechanical interface;
    wherein the first plug microlens transceives light between the first plug cable interface and the first plug connector optical interface;
a second plug including:
    a mechanical body;
    a cable interface formed in the mechanical body to engage the fiber optic line second end;
    a connector mechanical interface formed in the mechanical body capable of selectively engaging a second jack connector mechanical interface without permanently fixing the second plug connector mechanical interface to the second jack connector mechanical interface;
    a second plug microlens integrally formed in a transparent portion of the mechanical body;
    a connector optical interface forming a second air gap cavity with a length between the second plug microlens and a second jack connector optical interface, the length having a variable range of lengths subsequent to engaging the second jack connector mechanical interface with the second plug connector mechanical interface; and,
    wherein the second plug microlens transceives light between the second plug cable interface and the second plug connector optical interface.

2. The fiber optic cable of claim 1 wherein each microlens has a diameter in a range of about 1-3 millimeters (mm).

3. The fiber optic cable of claim 1 wherein each microlens includes a convex surface for interfacing with a jack connector optical interface and a planar surface for interfacing fiber optic line end; and,
wherein each fiber optic line end is formed in a focal plane of its corresponding microlens.

4. The fiber optic cable of claim 1 wherein the variable air gap cavity length is in a range of 0.1 to 1 mm.

5. A fiber optic plug connector comprising:
a mechanical body;
a cable interface formed in the mechanical body to fixedly engage a fiber optic line end;
a connector mechanical interface formed in the mechanical body capable of selectively engaging a jack connector mechanical interface without permanently fixing the plug connector mechanical interface to the jack connector mechanical interface;
a microlens integrally formed in a transparent portion of the mechanical body;
a connector optical interface forming a first air gap cavity with a length between the microlens and a jack connector optical interface, the length having a variable range of lengths subsequent to engaging the jack connector mechanical interface with the plug connector mechanical interface; and,
wherein the microlens transceives light between the cable interface and the connector optical interface.

6. The fiber optic plug connector of claim 5 wherein the microlens has a diameter in a range of about 1-3 millimeters (mm).

7. The fiber optic plug connector of claim 5 wherein the microlens includes a convex surface for interfacing with the jack connector optical interface and a planar surface for interfacing with the fiber optic line end; and,
wherein the fiber optic line end is formed in a focal plane of the microlens.

8. The fiber optic plug connector of claim 5 wherein the variable air gap cavity length is a range of 0.1 to 1 mm.

9. A fiber optic jack connector comprising:
a housing;
an electrical interface formed in the housing with a contact to engage a printed circuit board (PCB);
a connector mechanical interface formed in the housing capable of selectively engaging a plug connector mechanical interface without permanently fixing the plug connector mechanical interface to the jack connector mechanical interface;

an optic element embedded in the housing, selected from a group consisting of a photodiode and a laser, having an electrical interface connected to the contact and having an optical interface;

a microlens integrally formed in a transparent portion of the housing and optically connected to the optic element optical interface;

a connector optical interface forming a first air gap cavity with a length between the microlens and a plug connector optical interface, the length having a variable range of lengths subsequent to engaging the jack connector mechanical interface with the plug connector mechanical interface; and, wherein the microlens transceives light between the optic element optical interface and the connector optical interface.

10. The fiber optic jack connector of claim 9 wherein the microlens has a diameter in a range of about 1-3 millimeters (mm).

11. The fiber optic jack connector of claim 9 wherein the microlens includes a convex surface for interfacing with the plug connector optical interface and a planar surface for interfacing with the optic element optical interface; and, wherein the optic element optical interface is formed in a focal plane of the microlens.

12. The fiber optic jack connector of claim 9 wherein the variable air gap cavity length is in a range of 0.1 to 1 mm.

13. A fiber optic cable interface comprising:

a cable section including at least one length of fiber optic line having a first end and a second end;

a first fiber optic plug connector including:
  a mechanical body;
  a cable interface formed in the mechanical body to fixedly engage the fiber optic line first end;
  a connector mechanical interface formed in the mechanical body capable of selectively engaging a first jack connector mechanical interface without permanently fixing the first plug connector mechanical interface to the first jack connector mechanical interface;
  a first plug microlens integrally formed in a transparent portion of the mechanical body;
  a connector optical interface forming a first air gap cavity with a length extending from the first plug microlens the length having a variable range of lengths subsequent to engaging the first jack connector mechanical interface with the first plug connector mechanical interface:
  wherein the first plug microlens transceives light between the first plug cable interface and the first plug connector optical interface;

a second fiber optic plug including:
  a mechanical body;
  a cable interface formed in the mechanical body to fixedly engage the fiber optic line second end;
  a connector mechanical interface formed in the mechanical body capable of selectively engaging a second jack connector mechanical interface without permanently fixing the second plug connector mechanical interface to the second jack connector mechanical interface;
  a second plug microlens integrally formed in a transparent portion of the mechanical body;
  a connector optical interface forming a second air gap cavity with a length extending from the second plug microlens, the length having a variable range of lengths subsequent to engaging the second jack connector mechanical interface with the second plug connector mechanical interface;
  wherein the second plug microlens transceiver light between the second plug cable interface and the second plug connector optical interface;

a first fiber optic jack connector including:
  a housing;
  an electrical interface formed in the housing with a contact to engage a printed circuit board (PCB);
  a connector mechanical interface formed in the housing capable of selectively engaging the first plug connector mechanical interface without permanently fixing the first plug connector mechanical interface to the first jack connector mechanical interface;
  an optic element embedded in the housing, selected from a group consisting of a photodiode and a laser, having an electrical interface connected to the contact and having an optical interface;
  a first jack microlens integrally formed in a transparent portion of the housing and optically connected to the optic element optical interface;
  a connector optical interface forming the first air gap cavity with the length between the first jack microlens and the first plug microlens, the length having a variable range of lengths subsequent to engaging the first jack connector mechanical interface with the first plug connector mechanical interface; and,
  wherein the first jack microlens transceives light between the first jack optic element optical interface and the first jack connector optical interface;

a second fiber optic jack connector including:
  a housing;
  an electrical interface formed in the housing with a contact to engage a PCB;
  a connector mechanical interface formed in the housing capable of selectively engaging the second plug connector mechanical interface without permanently fixing the second plug connector mechanical interface to the second jack connector mechanical interface;
  an optic element embedded in the housing, unselected from the group consisting of the photodiode and the laser, having an electrical interface connected to the contact and having an optical interface;
  a second jack microlens integrally formed in a transparent portion of the housing and optically connected to the optic element optical interface;
  a connector optical interface forming the second air gap cavity with the length extending between the second jack microlens and the second plug microlens, the length having a variable range of lengths subsequent to engaging the second jack connector mechanical interface with the second plug connector mechanical interface; and,
  wherein the second jack microlens transceives light between the second jack optic element optical interface and the second jack connector optical interface.

14. The fiber optic cable interface of claim 13 wherein each of the microlenses has a diameter in a range of about 1-3 millimeters (mm).

15. The fiber optic cable interface of claim 13 wherein each jack inicrolens includes a convex surface for interfacing with a convex surface of the corresponding plug microlens, and a planar surface for interfacing with the corresponding optic element optical interface; and, wherein, each plug inicrolens has a planar surface for interfacing with the corresponding fiber optic line end.

16. The fiber optic cable interface of claim 13 wherein the first and second variable air gap cavity lengths are each in a range of 0.1 to 1 mm.

* * * * *

UNITED STATES PATENT AND TRADEMARK OFFICE
CERTIFICATE OF CORRECTION

| | | |
|---|---|---|
| PATENT NO. | : 8,109,677 B2 | Page 1 of 1 |
| APPLICATION NO. | : 13/150496 | |
| DATED | : February 7, 2012 | |
| INVENTOR(S) | : Igor Zhovnirovsky et al. | |

It is certified that error appears in the above-identified patent and that said Letters Patent is hereby corrected as shown below:

IN THE SPECIFICATIONS:

In column 4, line 56, the word "inner" has been incorrectly printed as "in er".

IN THE CLAIMS:

In column 8, lines 56 and 60 (Claim 15), the word "microlens" has been incorrectly printed as "inicrolens".

Claim 15 should be printed as follows:

15. The fiber optic cable interface of claim 13 wherein each jack microlens includes a convex surface for interfacing with a convex surface of the corresponding plug microlens, and a planar surface for interfacing with the corresponding optic element optical interface; and,
        wherein each plug microlens has a planar surface for interfacing with the corresponding fiber optic line end.

Signed and Sealed this
Twentieth Day of March, 2012

David J. Kappos
*Director of the United States Patent and Trademark Office*